(No Model.)

R. M. HUNTER.
ELECTRIC RAILWAY.

No. 431,977. Patented July 8, 1890.

Attest
Maurice H. Holmes
S. J. Yerkes.

Inventor
R. M. Hunter

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC RAILWAY.

SPECIFICATION forming part of Letters Patent No. 431,977, dated July 8, 1890.

Original application filed February 23, 1887, Serial No. 228,533. Divided and application filed October 18, 1889. Serial No. 327,460. Again divided and this application filed April 23, 1890. Serial No. 349,196. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements, which are fully set forth in the following specification, and shown in the accompanying drawings, which form a part thereof.

This application, Case No. 138, is a division of my application, Serial No. 327,460, Case No. 116, filed October 18, 1889, and which in turn is a division of my application, Serial No. 228,533, filed February 23, 1887.

My improvement forming the subject-matter of this application relates to a system of circuits adapted for electrically-propelled vehicles receiving current from a line conductor or conductors, whereby the resistance due to the line-circuit is the same for all positions of the cars upon the railway.

Figure 1:
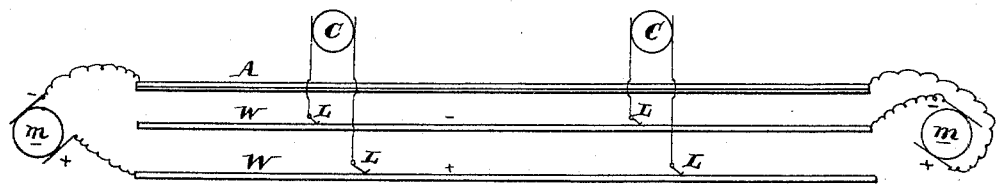
Figure 2:
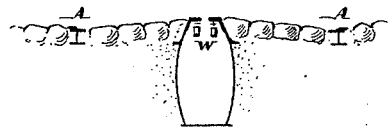

In the drawings, Figure 1 is a diagram illustrating my improved arrangement in circuits for supplying current to the vehicle or car; and Fig. 2 represents a cross-section of the railway, showing the conductors arranged within a conduit.

Referring to Fig. 1, it will be observed that the two working-conductors W W have their opposite ends connected with opposite poles of two generators $m$ $m$, the other poles of which generators are connected together by an electric circuit, which may be the ground, a conducting-wire, the rails A, as indicated, or may be formed in any other suitable manner. This couples the generators in series, and the current from each is passed through the other. As shown, the generators are at opposite ends of the conductors, requiring two generating-stations, which might be advisable in long lines where such stations could be used for local purposes; but these generators $m$ $m$ may, if desired, be arranged close together. With this construction of circuits the line-resistance through the motor and return will be the same for all positions of the motor upon the line, and consequently said resistance is a constant amount with respect to the transmission of energy for operating the electrically-propelled vehicles. Likewise the line-resistance will be the same for any number of electrically-propelled vehicles on the line—that is to say, the line-resistance for each motor will be the same irrespective of the positions of the motors on the line. If desired, the conductors W W may be located in the conduit, as shown in Fig. 2, or they may be supported in any other suitable manner, and current be received from them through suitable collecting devices L, of convenient construction for supplying the motor C of the electrically-propelled vehicles.

I do not limit myself to the details herein set out, as they may be modified in various ways without departing from the spirit of my invention.

Having now described my invention, what I claim as new, and desire to secure by Letters Patent, is—

1. In an electric railway, the combination of two working-conductors and two generators, each having their opposite poles connected with the opposite ends of the two working-conductors.

2. In an electric railway, the combination of a slotted conduit, two working-conductors inclosed in and insulated from said conduit, two generators, the positive and negative poles of the respective generators being connected with the opposite end of the respective conductors, and a connecting-circuit between the other poles of the two generators.

3. In an electric railway, the combination of two working-conductors, two generators, the positive pole of one generator being connected with one end of one of the conductors and the negative pole of the other generator being connected with the opposite end of the other conductor, and a connecting-circuit between the other poles of the two generators.

4. In an electric railway, the combination of two generators connected in series, two working-conductors, an electrically-propelled vehicle receiving current from said conductors, and a connection between the positive pole of one generator and negative pole of the other generator, respectively, with the opposite ends of the working-conductors.

5. In an electric railway, the combination of two working-conductors, two generators, the positive pole of one generator being connected with one end of one of the conductors and the negative pole of the other generator being connected with the opposite end of the other conductor, and a connecting-circuit including the rails between the other poles of the two generators.

6. In an electric railway, the combination of two working-conductors, two generators, the positive pole of one generator being connected with one end of one of the conductors and the negative pole of the other generator being connected with the opposite end of the other conductor, and a connecting-circuit including the railway structure between the other poles of the two generators.

In testimony of which invention I have hereunto set my hand.

R. M. HUNTER.

Witnesses:
A. J. DUNN,
S. T. YERKES.